United States Patent [19]
Frey et al.

[11] Patent Number: 5,427,419
[45] Date of Patent: Jun. 27, 1995

[54] PIPE SYSTEM

[75] Inventors: Heinz Frey, Menziken; Meinrad Laim, Ennetbaden, both of Switzerland

[73] Assignee: Asea Brown Boveri Ltd., Baden, Switzerland

[21] Appl. No.: 5,782

[22] Filed: Jan. 19, 1993

[30] Foreign Application Priority Data

Feb. 15, 1992 [DE] Germany .............. 42 04 530.4

[51] Int. Cl.$^6$ .................................... F16L 47/00
[52] U.S. Cl. ......................... 285/133.1; 285/156; 285/227; 285/906
[58] Field of Search ............. 285/133.1, 156, 226, 285/227, 299, 300, 301, 138, 906

[56] References Cited

U.S. PATENT DOCUMENTS

| | | | |
|---|---|---|---|
| 2,196,766 | 4/1940 | Hasche | 285/227 X |
| 2,366,809 | 1/1945 | Seemann | 285/133.1 |
| 2,437,385 | 3/1948 | Halford | 285/227 X |
| 2,475,635 | 7/1949 | Parsons | 285/133.1 X |
| 2,658,527 | 11/1953 | Kaiser | 285/183.1 |
| 2,956,586 | 10/1960 | Zeigler et al. | 285/133.1 X |
| 3,878,868 | 4/1975 | Wheeler | 285/300 X |
| 4,099,746 | 7/1978 | Kontsch et al. | 285/226 X |
| 4,860,638 | 8/1989 | Hosono et al. | 285/133.1 X |
| 4,886,305 | 12/1989 | Martin | 285/133.1 |
| 4,922,971 | 5/1990 | Grantham | 285/133.1 X |
| 5,203,384 | 4/1993 | Hansen | 285/133.1 |

FOREIGN PATENT DOCUMENTS

| | | | |
|---|---|---|---|
| 399192 | 7/1924 | Germany | 285/133.1 |
| 2525693 | 12/1976 | Germany | . |
| 2739114 | 3/1979 | Germany | . |

*Primary Examiner*—Dave W. Arola
*Attorney, Agent, or Firm*—Burns, Doane, Swecker & Mathis

[57] ABSTRACT

This pipe system has a pressurized feed conduit and an outflow conduit for a hydraulic fluid. It furthermore has parts (6, 8, 10) for connection to a hydraulically actuable device.

The intention is to create a pipe system which is improved as regards safety of operation and fire protection and has a smaller space requirement. This is achieved by the fact that the pressurized feed conduit is arranged inside the outflow conduit, this arrangement being maintained right into the interior of the hydraulically actuable device.

12 Claims, 3 Drawing Sheets

PIPE SYSTEM

BACKGROUND OF THE INVENTION

1. Field of the Invention

The invention starts from a pipe system for hydraulic installations.

2. Discussion of Background

Servomotors for actuating valves in the steam feed region of turbines are generally driven hydraulically. A first pipe conduit feeds the power-transmitting oil under pressure into the servomotor and a second pipe conduit carries the oil out of the servomotor and into the outflow. The pipe conduit for the power-transmitting oil is shielded by a sheet-metal cladding which makes it safe to tread on. This sheet-metal cladding also serves as fire protection.

In the event of a leak in the pipe conduit for the power-transmitting oil, the sheet-metal cladding can only delay the escape of the oil.

SUMMARY OF THE INVENTION

Accordingly, one object of the invention is to improve the previous pipe conduit system as regards safety of operation and fire protection and, in addition, to reduce the space requirement.

The advantages achieved by means of the invention are essentially to be regarded as the fact that less work is involved in fitting the pipe system in the installation. It is furthermore advantageous that less qualified personnel can be used for fitting without needing to reduce the requirements relating to quality assurance.

BRIEF DESCRIPTION OF THE DRAWINGS

A more complete appreciation of the invention, its further development and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
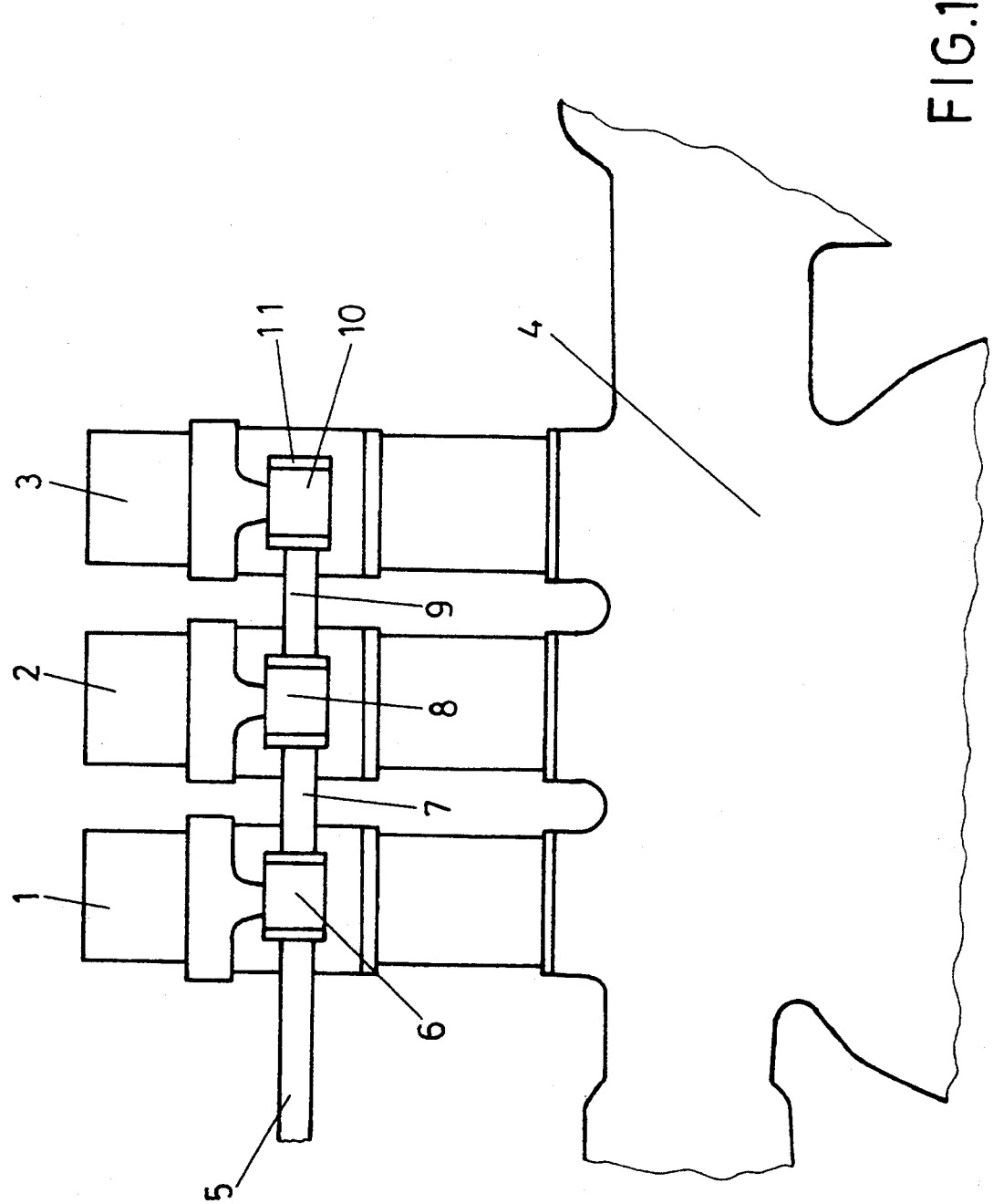
FIG. 1 shows an embodiment of the invention.

Referring now to the drawings, wherein like reference numerals designate identical or corresponding parts throughout the several views, FIG. 1 shows, in schematic representation, control servomotors 1, 2, 3, which are seated on a turbine casing 4. The valve casings of the valves which are actuated by these control servomotors 1, 2, 3 are here arranged inside the turbine casing 4. The control servomotors 1, 2, 3 are actuated hydraulically. Oil under pressure is fed in for the actuation of the servomotors 1, 2, 3 via an actuating conduit 5, inside which is a pressurized feed conduit. This feed conduit is enclosed by an outflow conduit for the oil leaving the servomotors 1, 2, 3 and flowing into the outflow. Instead of the servomotors, it is also possible for other hydraulic devices or combinations of devices to be actuated simultaneously and in parallel. The actuating conduit 5, which is made up of two conduits, is flanged to a connection part 6. This connection part 6 is designed as part of control servomotor 1. An intermediate piece 7, in which the feed conduit likewise runs within the outflow conduit, connects connection part 6 to a connection part 8, which is designed as part of control servomotor 2. A further intermediate piece 9, the design of which is the same as that of intermediate piece 7, forms the connection to a connection part 10, which is designed as part of control servomotor 3. The end opening of connection part 10 is closed by an end flange 11 which, on the one hand, closes the outflow conduit with respect to the outside and, on the other hand, seals off the feed conduit from the outflow conduit.

Figure 2:
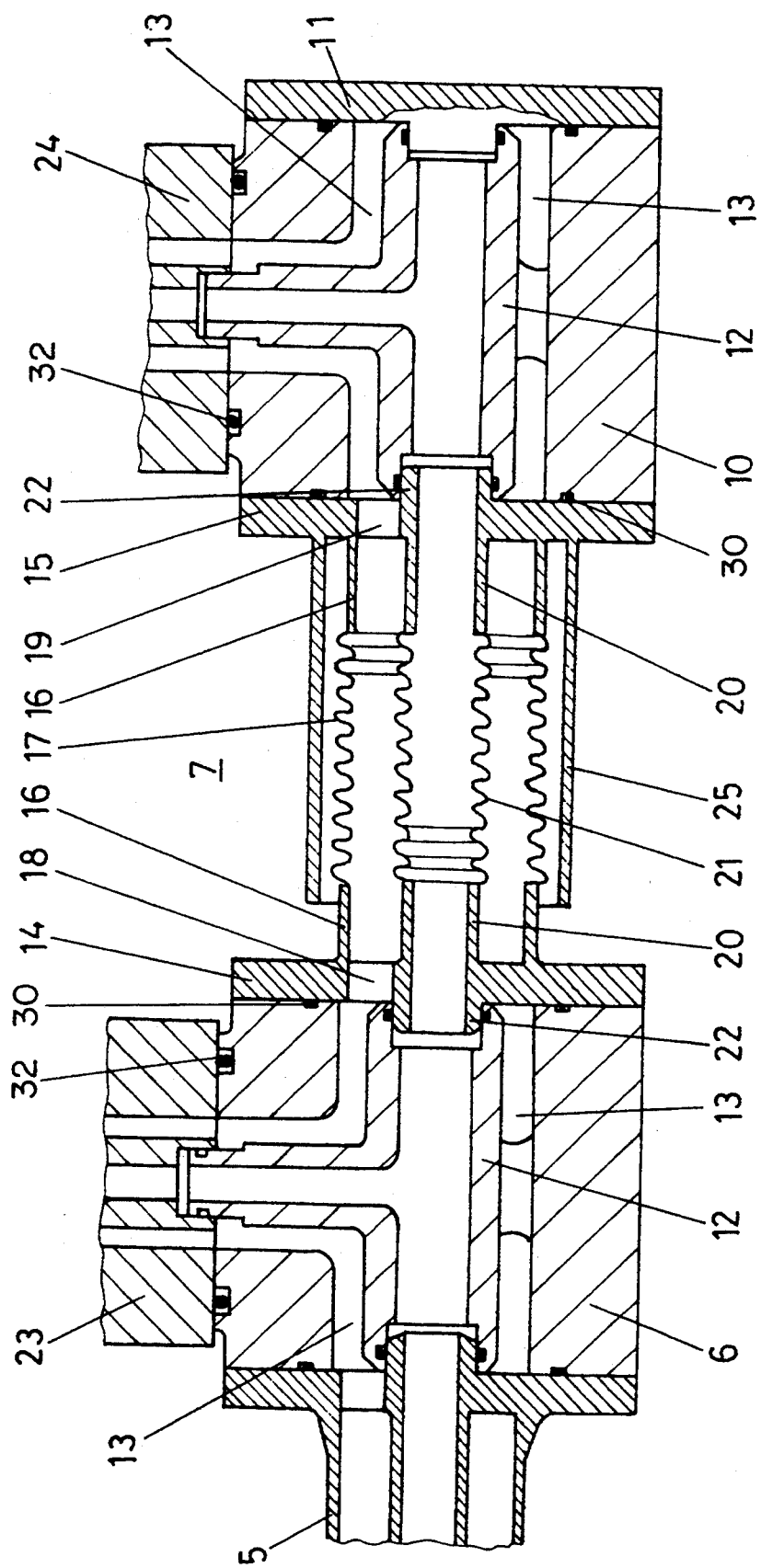
FIG. 2 shows a first development of the embodiment according to FIG. 1.
Figure 3:
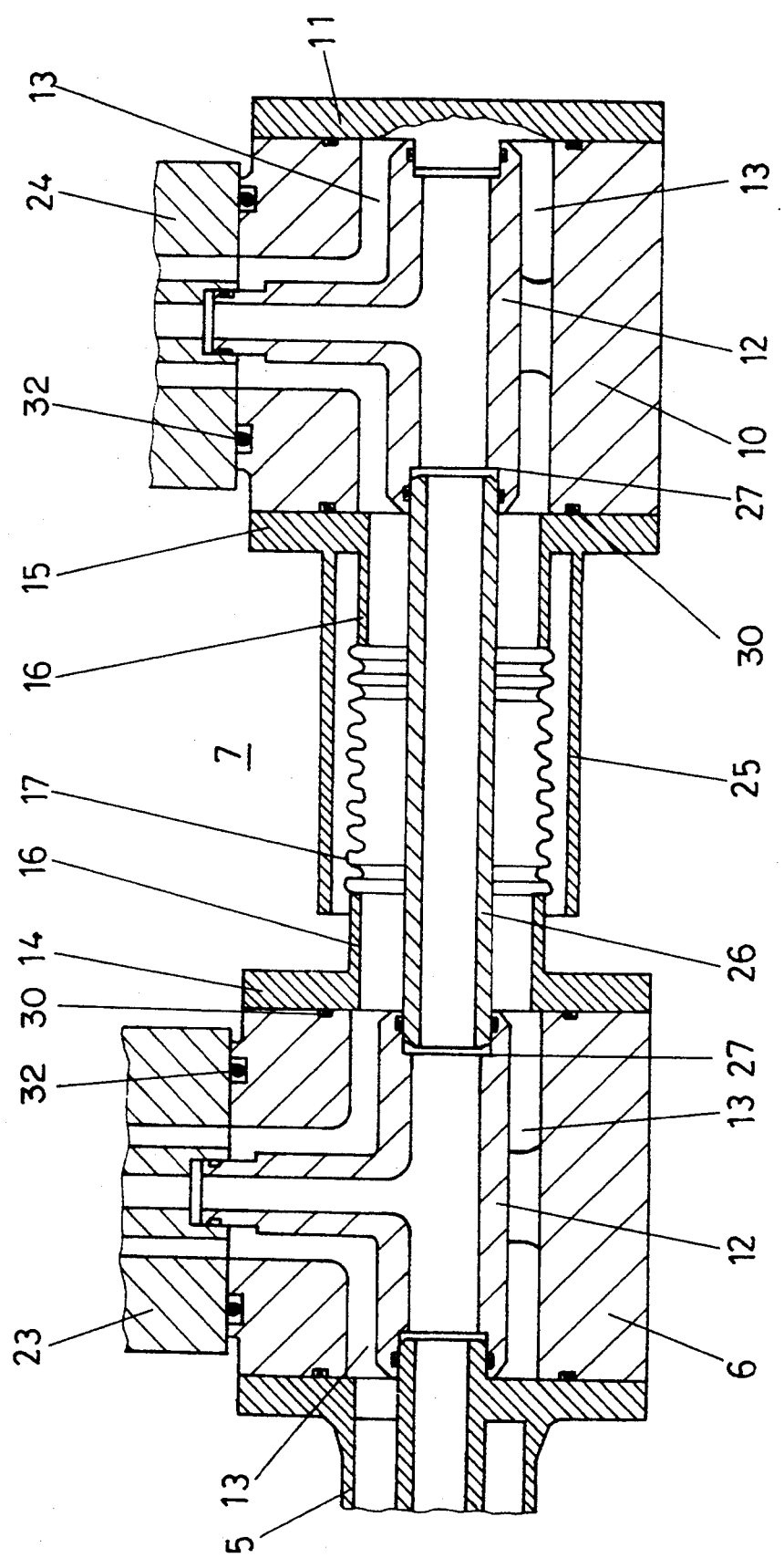
FIG. 3 shows a second development of the embodiment according to FIG. 1.

The connection parts 6, 8 and 10 preferably have the same dimensions and, as can be seen from FIGS. 2 and 3, they contain conduits of T-shaped design, of which the inner conduit 12 is designed as part of the pressurized feed conduit. The outer conduit 13 surrounding the inner conduit 12 is designed as part of the outflow conduit. This arrangement of the two conduits 12, 13 is maintained right through the connection parts 6, 8, 10 and into the hydraulically actuable devices, such as, for example, here into the control servomotors 1, 2, 3 where it is in general a piston-cylinder arrangement which is actuated by the oil under pressure fed in. By means of this consistently maintained routing of the pressurized feed conduit, it is ensured that any leaks in this feed conduit cannot cause serious damage in the installation, such as, for example, fires.

FIGS. 2 and 3 show connection parts 6 and 10, in which the inner conduit 12 is cast integrally into the respective connection part. However, it is also possible to assemble this inner conduit 12 pressure-tightly from corresponding pieces of tube and then to fix this conduit in the respective connection part.

Adjacent connection parts are connected to one another by intermediate pieces 7 and 9. These intermediate pieces 7, 9 are designed in such a way that they can compensate manufacturing tolerances and/or thermal expansions unavoidable in this region both in the axial direction and to a certain extent in the radial direction. These intermediate pieces 7, 9 can be of one- or two-part design. FIG. 2 shows an intermediate piece 7 of one-piece design which connects connection parts 6 and 10 pressure-tightly to one another. The intermediate piece 7 has two flanges 14, 15 at the ends. An outer pipe stub 16 is welded to each of the flanges. The ends of the two pipe stubs 16 are connected by means of a pressure-tightly welded, elastic steel bellows 17. Provided in the flanges 14, 15 are apertures 18, 19 which allow the oil to flow through into the outflow. Provided in the center of the flanges 14, 15 are further pipe stubs 20 which lie inside the outer pipe stubs 16. The ends of the two pipe stubs 20 are connected to one another by means of a pressure-tightly welded, elastic steel bellows 21. The conduit formed in this way is part of the feed conduit for the oil under pressure.

The flanges 14 and 15 are screwed pressure-tightly to the corresponding connection parts 6 and 10 by screws 30. Sealing rings arranged in a known manner, which will not be described in greater detail here, guarantee this tightness. In addition, the flanges 14 and 15 are provided in the center with stubs 22 which project into the inner conduits 12 of the connection parts 6 and 10 and are connected pressure-tightly to these conduits 12 by means of ring seals. The length of the stubs 22 is such that tightness is guaranteed in all cases. The flange connection between connection part 6 and a casing 23 of the associated control servomotor is likewise fastened by screws 32 and sealed off by means of a sealing ring, as is the corresponding connection between connection part 10 and a casing 24 of the corresponding control servomotor.

The actuating conduit 5 is designed with sufficient mechanical stability, virtually excluding damage to this conduit under normal circumstances. The inner feed conduit for the oil under pressure is accordingly likewise well protected. The single remaining mechanical weak point in this pipe conduit system is the steel bellows 17 in the intermediate piece 7. In order to achieve good protection against mechanical damage even here, a protective tube 25 is provided, the said protective tube being connected to flange 15 and covering the said steel bellows 17.

The arrangement according to FIG. 3 differs from that according to FIG. 2 only in that the intermediate piece 7 consists of two parts. The feed conduit is passed through the intermediate piece 7 in a separate tube 26 which is not connected to the flanges 14, 15. The ends of this tube 26 project into the inner conduits 12 of the connection parts 6 and 10 and are connected pressure-tightly to these conduits 12 by means of sealing rings. A stop 27 inside the conduits 12 prevents the tube 26 from sliding and tightness is thus guaranteed in all cases.

To explain the manner of operation, the figures will be considered in somewhat greater detail. Oil under pressure flows through the inner conduit, designed as a feed conduit, of the actuating conduit 5 into the inner conduit 12 of connection part 6 and on through the intermediate piece 7 into the inner conduit 12 of connection part 10. The end flange 11 prevents the oil from flowing on in this conduit. The pressure in the inner conduits 12 causes an oil flow into the respective branching part of the conduit 12 into the casings 23 and 24. The oil under pressure is guided into a cylinder-piston arrangement (not shown) of the corresponding servomotors and moves the piston, the position of the valve controlled by the respective servomotor thereby being altered. The oil leaving the cylinder-piston arrangement is passed through the outflow conduit which surrounds the feed conduit for the oil under pressure into the respective casing 23, 24 and on into the outer conduit 13 in the connection parts 6, 10. From there, some of the oil flows through the apertures 18, 19 and the intermediate piece 7 and on into the outer outflow conduit of the actuating conduit 5. This conduit 5 carries the oil into the outflow.

This pipe conduit system offers a high degree of safety of operation, particularly in the actuation of control servomotors in the region of steam turbines.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pipe system for hydraulic installations comprising:
    a pressurized feed conduit and an outflow conduit for a hydraulic fluid, the pressurized feed conduit being disposed inside and surrounded by the outflow conduit;
    a connection part connected to conduct hydraulic fluid between at least one hydraulically actuable device and the feed and outflow conduits,
    the connection part including a T-shaped piece dividing the connection part into an inner passage communicating with the pressurized feed conduit and a pressurized feed inlet of the hydraulically actuable device, and an outer passage surrounding the inner passage throughout the connection part and communicating with the outflow conduit and an outflow outlet of the hydraulically actuable device, the T-shaped piece being cast integrally as part of the connection part;
    means to sealingly fasten the connection part to the pressurized feed conduit and outflow conduit; and,
    means to sealingly fasten the connection part to the hydraulically actuable device.

2. The pipe system as claimed in claim 1, comprising at least two connection parts for connecting at least two hydraulically actuable devices in series, and intermediate pieces fitted between adjacent connection parts to connect respective inner passages and outer passages of the connection parts, the intermediate pieces having means to compensate for at least one of manufacturing tolerances and thermal expansions, and means to sealingly fasten the intermediate parts to the connecting parts.

3. The pipe system as claimed in claim 2, wherein the intermediate piece comprises two parts including an inner conduit and a separate outer conduit.

4. The pipe system as claimed in claim 3, wherein the intermediate piece comprises:
    an inner, pressurized feed conduit having a rigid tube and means for inserting the tube pressure-tightly into corresponding sockets of the respectively adjacent connection parts; and
    an outer tube for the outflow conduit including opposing end flanges having projecting tube stubs and an elastic steel bellows welded at both ends to the stubs of each flange, and means for connecting the flanges to the connection parts.

5. The pipe system as claimed in claim 2, wherein the intermediate piece comprises one part forming the inner and outer conduits.

6. The pipe system as claimed in claim 5, wherein the intermediate piece comprises:
    opposing end flanges fastened to the adjacent connection parts, each flange having an inner tube stub for the pressurized feed conduit and an outer tube stub surrounding the inner tube stub for the outflow conduit projecting from the flange;
    means for sealing the end flanges to the connection parts; and
    an inner elastic steel bellows connecting the respective feed tube stubs of each flange and an outer elastic steel bellows connecting the respective outer stubs of each flange.

7. The pipe system as claimed in claim 6, the intermediate piece further comprising
    a protective tube rigidly connected to one of the flanges and covering the outflow conduit.

8. The pipe system as claimed in claim 7, wherein the protective tube has a cylindrical shape.

9. A pipe system for hydraulic installations comprising:
    a pressurized feed conduit and an outflow conduit for a hydraulic fluid, the pressurized feed conduit being disposed within the outflow conduit to be surrounded by a flow in the outflow conduit;
    at least one connection part for connecting the pressurized feed conduit and the outflow conduit to a respective pressurized feed inlet and an outlet of a hydraulically actuable device;

each connection part having a T-shaped piece dividing the connection part into inner and outer T-shaped passages, the outer passage surrounding the inner passage, the inner passage communicating with the pressurized feed conduit and the outer passage communicating with the outflow conduit, the T-shaped piece being cast integrally as part of the connection part;

means to sealingly fasten the at least one connecting part to the pressurized feed inlet and outlet; and intermediate pieces connecting adjacent connection parts, the intermediate pieces having opposing end flanges fastened to the connection parts, each flange having an inner tube stub for the pressurized feed conduit and an outer tube stub surrounding the inner tube stub for the outflow conduit, the outer tube stub projecting from the flange, an inner elastic steel bellows connecting the respective feed tube stubs of each flange and an outer elastic steel bellows connecting the respective outer stubs of each flange, and means for connecting the flanges to the connection parts to seal for pressurized flow therethrough.

10. The pipe system as claimed in claim 9, wherein each intermediate piece further comprises a protective tube rigidly connected to one of the flanges and covering the outflow conduit.

11. The pipe system as claimed in claim 10, wherein the protective tube has a cylindrical shape.

12. A pipe system for hydraulic installations comprising:

a pressurized feed conduit and an outflow conduit for a hydraulic fluid, the pressurized feed conduit being disposed inside the outflow conduit to be surrounded by a flow in the outflow conduit;

at least one connection part for connecting the pressurized feed conduit and the outflow conduit to a respective pressurized inlet and outflow outlet of a hydraulically actuable device;

each connection part having a T-shaped piece dividing the connection part into an inner and an outer T-shaped passage, the outer passage surrounding the inner passage, the inner passage communicating with the pressurized feed conduit and the outer passage communicating with the outflow conduit, the T-shaped piece being cast integrally as part of the connection part; and means to sealingly fasten the at least one connecting part to the pressurized feed inlet and outlet for pressurized flow;

intermediate pieces fastened between adjacent connection parts, the intermediate pieces comprising two parts including an inner, pressurized feed conduit having a rigid tube and means for inserting the tube pressure-tightly into corresponding sockets of the respective adjacent connection parts, an outer tube for the outflow conduit including opposing end flanges having projecting tube stubs and an elastic steel bellows welded at both ends to the stubs of each flange, and means for connecting the flanges to the connection parts to seal for pressurized flow therethrough.

* * * * *